(12) United States Patent
Mizobata et al.

(10) Patent No.: US 10,124,701 B2
(45) Date of Patent: Nov. 13, 2018

(54) VEHICLE SEAT

(71) Applicant: TOYOTA BOSHOKU KABUSHIKI KAISHA, Aichi-ken (JP)

(72) Inventors: Hiroshi Mizobata, Aichi-ken (JP); Fumitoshi Akaike, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/687,096

(22) Filed: Aug. 25, 2017

(65) Prior Publication Data

US 2018/0056817 A1 Mar. 1, 2018

(30) Foreign Application Priority Data

Aug. 29, 2016 (JP) .................................. 2016-166540

(51) Int. Cl.
*B60N 2/20* (2006.01)
*B60N 2/22* (2006.01)
*B60N 2/68* (2006.01)

(52) U.S. Cl.
CPC .............. *B60N 2/2236* (2013.01); *B60N 2/68* (2013.01)

(58) Field of Classification Search
CPC ................................ B60N 2/2236; B60N 2/68
USPC ........................................ 297/440.15, 452.18
See application file for complete search history.

(56) References Cited

U.S. PATENT DOCUMENTS

| | | | | |
|---|---|---|---|---|
| 5,788,331 A | * | 8/1998 | Aufrere | B60N 2/68 297/452.18 X |
| 6,375,267 B1 | * | 4/2002 | Ishikawa | B60N 2/68 297/452.18 |
| 6,767,067 B2 | * | 7/2004 | Fourrey | B29C 70/44 297/452.18 |
| 6,817,672 B2 | * | 11/2004 | Matsunuma | B60N 2/682 297/452.18 |
| 7,794,020 B2 | * | 9/2010 | Dallos | B60N 2/682 297/440.15 |
| 8,523,284 B2 | * | 9/2013 | Yamada | B60N 2/22 297/452.18 X |
| 8,888,191 B2 | * | 11/2014 | Hosokawa | B60N 2/22 297/452.18 |
| 9,481,278 B2 | * | 11/2016 | Mitsuhashi | B60N 2/68 |
| 2005/0168041 A1 | * | 8/2005 | Glance | B60N 2/68 297/452.18 |
| 2006/0103223 A1 | * | 5/2006 | Nagayama | A47C 7/40 297/452.18 |

(Continued)

FOREIGN PATENT DOCUMENTS

JP 2015-227071 12/2015

*Primary Examiner* — Rodney B White
(74) *Attorney, Agent, or Firm* — Greenblum & Bernstein, P.L.C.

(57) ABSTRACT

A vehicle seat including: a seat adjuster serving as an angle adjustment mechanism of a seat component; a seat frame integrally coupled to the seat adjuster and having a through-hole through which an outer surface portion of the seat adjuster is exposed; and a holding member which holds the seat adjuster in a state of being coupled to the seat frame by being coupled with the outer surface portion of the seat adjuster exposed through the through-hole and protruding outward than the through-hole in a hole diameter direction of the through-hole such that the seat frame is sandwiched between the seat adjuster and the holding member.

7 Claims, 14 Drawing Sheets

(56) References Cited

U.S. PATENT DOCUMENTS

| | | | |
|---|---|---|---|
| 2006/0152060 A1* | 7/2006 | Nagayama | B60R 21/20 297/452.18 |
| 2006/0284470 A1* | 12/2006 | Ogawa | B60N 2/4228 297/452.18 |
| 2011/0169317 A1* | 7/2011 | Fujita | A47C 7/02 297/452.18 X |
| 2012/0217775 A1* | 8/2012 | Fujita | B60N 2/4221 297/452.18 X |
| 2013/0119741 A1* | 5/2013 | Medoro | B60N 2/686 297/452.18 |
| 2013/0328342 A1* | 12/2013 | Okimura | B60N 2/20 297/354.12 X |
| 2014/0232162 A1* | 8/2014 | Mitsuhashi | B60N 2/68 297/452.18 |
| 2014/0375106 A1* | 12/2014 | Yamada | B60N 2/682 297/452.18 |
| 2016/0096461 A1* | 4/2016 | Coppuck | B60N 2/68 297/452.18 X |

* cited by examiner

VEHICLE SEAT

CROSS-REFERENCE TO RELATED APPLICATIONS

This application claims priority from Japanese Patent Application No. 2016-166540 filed on Aug. 29, 2016, the entire contents of which are incorporated herein by reference.

TECHNICAL FIELD

The disclosure relates to a vehicle seat. Specifically, the disclosure relates to a vehicle seat including a seat adjuster serving as an angle adjustbement mechanism of a seat component and a seat frame integrally coupled to the seat adjuster.

BACKGROUND

An automobile seat which includes a recliner capable of adjusting an inclination angle of a seat back has been known (see JP-A-2015-227071). The above-described recliner is interposed between each side frame of the seat back and each support frame on the base side located at outer sides of each side frame and is firmly and integrally coupled to these frames by welding.

In the above-described related art, in a case where the recliner and the frames on each side are made of different materials which are difficult to be welded to each other, there is a possibility that the coupling between these parts becomes complicated or insufficient.

SUMMARY

The disclosure has been made to solve the above-described problem and an object of the disclosure is to make it possible to easily and properly couple a seat adjuster serving as an angle adjustment mechanism of a seat component to a seat frame by using a method other than direct welding.

According to an aspect of the disclosure, there is provided a vehicle seat including: a seat adjuster serving as an angle adjustment mechanism of a seat component; a seat frame integrally coupled to the seat adjuster and having a through-hole through which an outer surface portion of the seat adjuster is exposed; and a holding member which holds the seat adjuster in a state of being coupled to the seat frame by being coupled with the outer surface portion of the seat adjuster exposed through the through-hole and protruding outward than the through-hole in a hole diameter direction of the through-hole such that the seat frame is sandwiched between the seat adjuster and the holding member.

Accordingly, since the outer surface portion of the seat adjuster and the holding member are coupled to each other through the through-hole of the seat frame such that the seat frame is sandwiched therebetween, the seat adjuster can be easily and properly coupled to the seat frame by using a method other than direct welding.

DETAILED DESCRIPTION

Hereinafter, modes for carrying out the disclosure will be described with reference to the drawings.

First Embodiment

Figure 1:
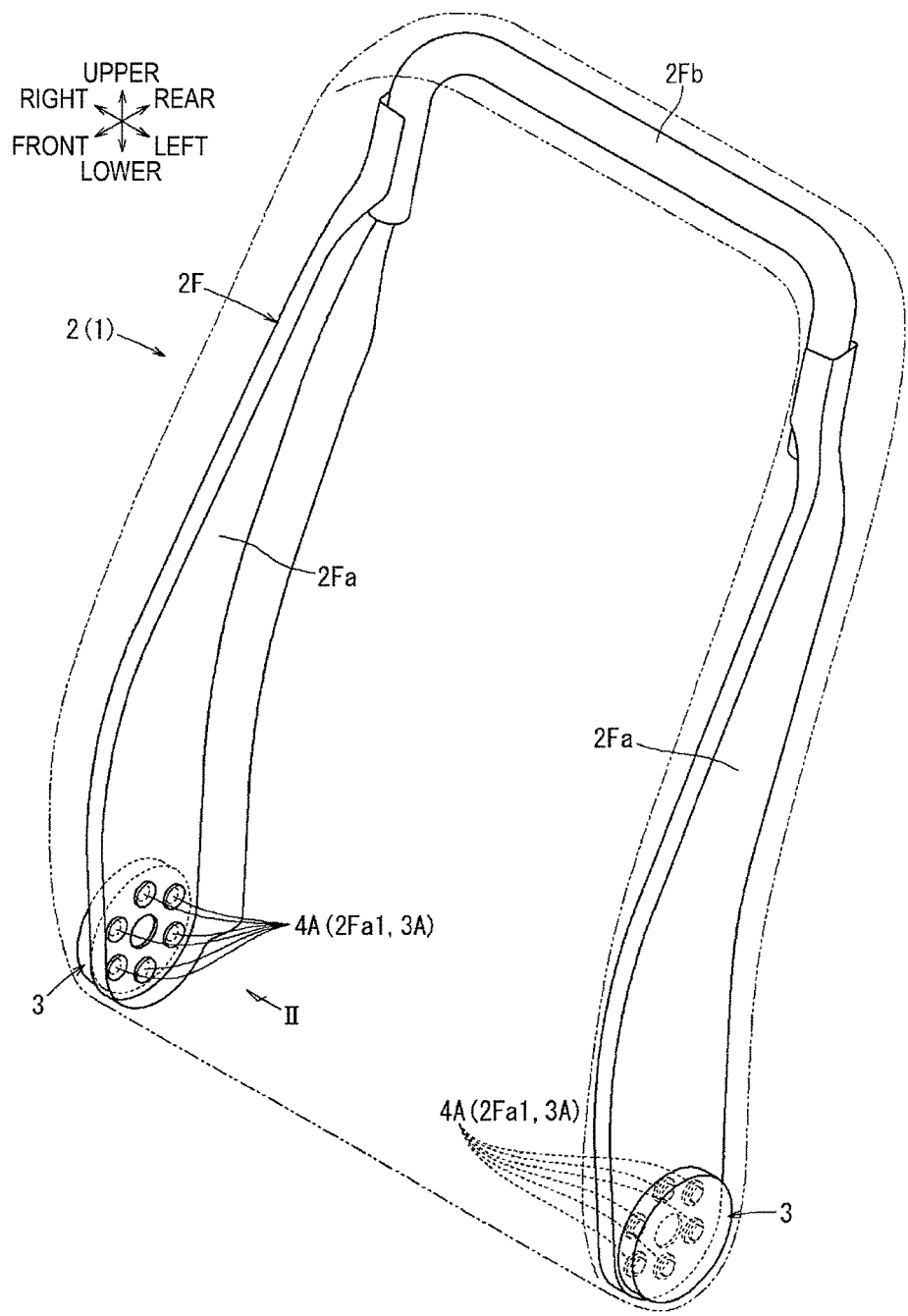
FIG. 1 is a perspective view showing a schematic configuration of a vehicle seat according to a first embodiment.
Figure 2:
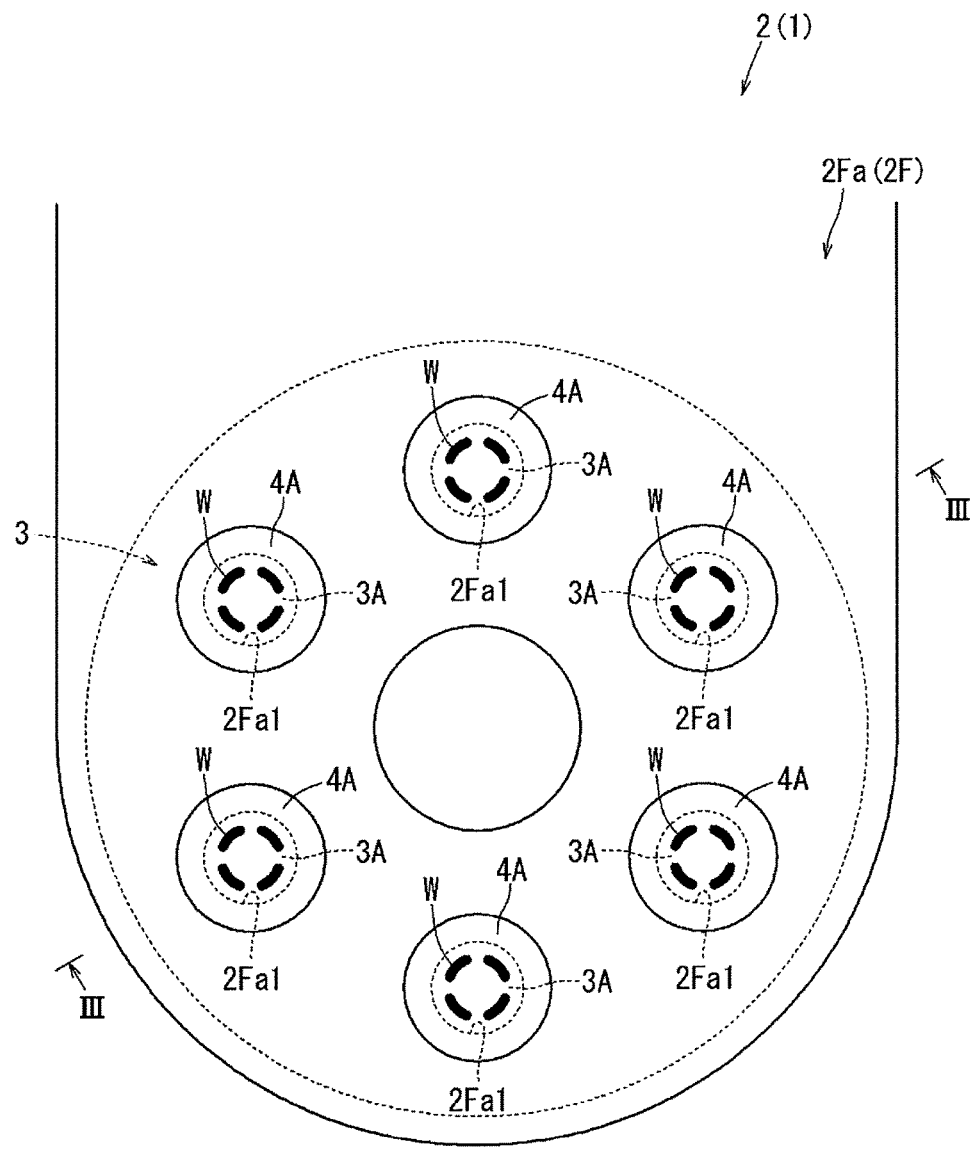
FIG. 2 is a side view showing part II in FIG. 1 in an enlarged manner.
Figure 3:
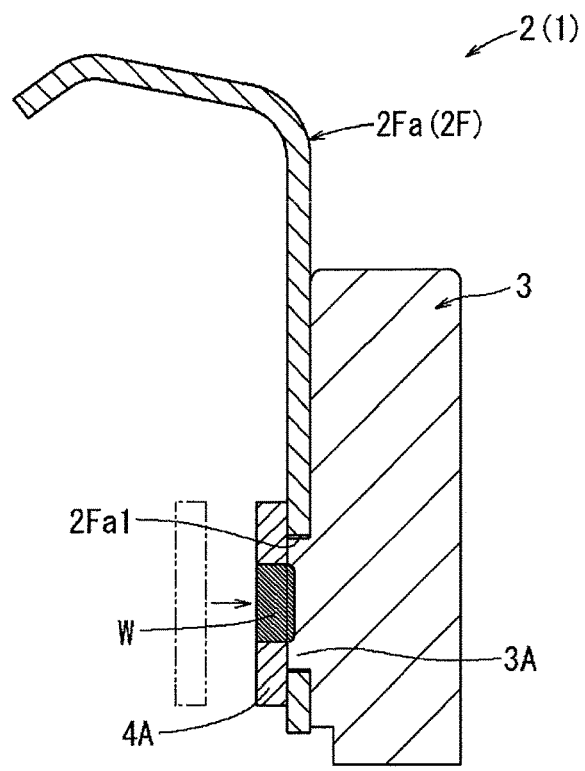
FIG. 3 is a sectional view taken along line III-III in FIG. 2.
Figure 3:
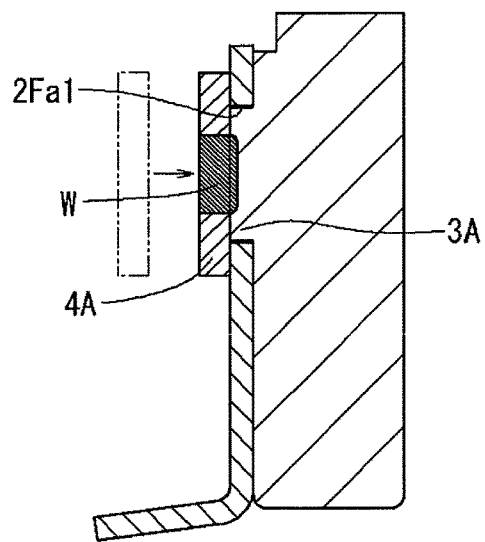

First, a configuration of a seat 1 (vehicle seat) according to a first embodiment will be described with reference to FIGS. 1 to 3. As shown in FIG. 1, the seat 1 of the present embodiment is configured as a seat of an automobile and includes a seat back 2 serving as a backrest part of a seated person and a seat cushion (not shown) serving as a seating part. In the above-described seat back 2, a metallic back frame 2F constituting its internal framework has a substantially inverted U-shaped configuration by a pair of left and right side frames 2Fa made of vertically elongated iron plate materials and an upper frame 2Fb integrally bridged between upper end portions of the respective side frames 2Fa and made of an iron pipe.

Each side frame 2Fa described above is disposed with its surface facing in a seat width direction, respectively. A substantially disc-shaped recliner 3 serving as a seat relining adjustment mechanism is coupled to an outer surface portion on a lower end side of each side frame 2Fa, respectively. These side frames 2Fa are connected to a rear end portion of the seat cushion (not shown) via these recliners 3. With this configuration, the seat back 2 is configured such that a backrest angle with respect to the seat cushion (not shown) can be adjusted via each of the above-described recliners 3. Here, a specific configuration of each recliner 3 is the same as the known configuration disclosed in the literature such as JP-A-2015-209069 or JP-A-2011-240758, and therefore, a detailed description thereof will be omitted. Here, each recliner 3 corresponds to the "seat adjuster" of the disclosure and each side frame 2Fa corresponds to the "seat frame" of the disclosure.

Specifically, each of the above-described recliners 3 is integrally coupled to the side frame 2Fa on each side by the following procedure. First, as shown in FIGS. 2 and 3, components on an inner surface side of each recliner 3 facing an outer surface portion of each side frame 2Fa are set in a state of being superimposed on the outer surface portion of each side frame 2Fa, respectively. For details, the components of each recliner 3 are set in a state of being superimposed on the outer surface portion of each side frame 2Fa in such a way that each of six columnar protrusions 3A formed to protrude on the inner surface portion of these components and arranged in a circumferential direction is fitted into each of through-holes 2Fa1 formed through six corresponding positions of each side frame 2Fa and having a regular circular shape. With this assembling, a tip end surface portion of each protrusion 3A inserted into each through-hole 2Fa1 is assembled in a shape that is substantially flush with the inner surface portion of each side frame 2Fa, respectively.

Subsequently, from the inner surface side of each side frame 2Fa, each lid plate 4A having a disc shape larger than each through-hole 2Fa1 is set in a state where each lid plate 4A is brought into contact with each side frame 2Fa so that each through-hole 2Fa1 through which each of the above-described protrusions 3A is exposed is closed by a lid. Then, contact places between the end surface portion of each protrusion 3A and each lid plate 4A which are brought into contact with each other by this assembling are integrally coupled by laser welding (welding place W). With this coupling, each side frame 2Fa is sandwiched between the components on the inner surface side of each recliner 3 and each lid plate 4A integrally coupled to these components. In this way, each recliner 3 is integrally coupled to each side frame 2Fa via each lid plate 4A. Here, each lid plate 4A corresponds to the "holding member" of the disclosure.

Each lid plate 4A described above is configured to be welded in a state of being abutted against the end surface portion of each protrusion 3A which is assembled to be substantially flush with the inner surface portion of each side frame 2Fa through each through-hole 2Fa1 provided in each side frame 2Fa described above. Therefore, each lid plate 4A is assembled in a state where its peripheral edge portion protruding outward in the hole diameter direction than each through-hole 2Fa1 is also widely abutted against the inner surface portion of each side frame 2Fa. With this configuration, each recliner 3 is assembled to each side frame 2Fa such that rattling in the seat width direction does not occur. Further, since each recliner 3 is assembled in a state where each protrusion 3A is fitted in the through-hole 2Fa1 of each side frame 2Fa, each recliner 3 is assembled in a form to have high joining strength and high structural strength such that each recliner is difficult to be peeled or deformed in a rotational direction (hole diameter direction) with respect to each side frame 2Fa.

To summarize the above, the seat 1 of the present embodiment has the following structure. That is, the vehicle seat (seat 1) includes the seat adjuster (recliner 3) serving as an angle adjustment mechanism of a seat component, the seat frame (side frame 2Fa) integrally coupled to the seat adjuster (recliner 3) and having the through-hole (through-hole 2Fa1) through which the outer surface portion (protrusion 3A) of the seat adjuster (recliner 3) is exposed, and the holding member (lid plate 4A) which holds the seat adjuster (recliner 3) in a state of being coupled to the seat frame (side frame 2Fa) by being coupled with the outer surface portion (protrusion 3A) of the seat adjuster (recliner 3) exposed through the through-hole (through-hole 2Fa1) and protruding outward than the through-hole (through-hole 2Fa1) in the hole diameter direction of the through-hole (through-hole 2Fa1) such that the seat frame (side frame 2Fa) is sandwiched between the seat adjuster (recliner 3) and the holding member.

In this way, since the outer surface portion (protrusion 3A) of the seat adjuster (recliner 3) and the holding member (lid plate 4A) are coupled to each other through the through-hole (through-hole 2Fa1) of the seat frame (side frame 2Fa) such that the seat frame (side frame 2Fa) is sandwiched therebetween, the seat adjuster (recliner 3) can be easily and properly coupled to the seat frame (side frame 2Fa) by using a method other than direct welding. Therefore, since there is no influence of heat input caused by the direct welding when coupling the seat adjuster (recliner 3) to the seat frame (side frame 2Fa), both parts can be easily and properly coupled to each other without causing assembly defects such as burn-through. Furthermore, even when the seat adjuster (recliner 3) and the seat frame (side frame 2Fa) are made of a combination of dissimilar materials which are difficult to be directly welded to each other, such as a combination of an iron material and an aluminum material, both parts can be easily and properly coupled to each other by adopting the above configuration.

Further, the outer surface portion (protrusion 3A) of the seat adjuster (recliner 3) exposed through the through-hole (through-hole 2Fa1) includes the protrusion which is inserted into the through-hole (through-hole 2Fa1). The coupling strength of the seat adjuster (recliner 3) to the seat frame (side frame 2Fa) can be appropriately increased by the structure in which the protrusion (protrusion 3A) is inserted and supported in the through-hole (through-hole 2Fa1) as described above. Further, since the protrusion (protrusion 3A) is inserted into the through-hole (through-hole 2Fa1), the outer surface portion (protrusion 3A) of the seat adjuster (recliner 3) is provided in a state of being raised from the deep side of the through-hole (through-hole 2Fa1). Therefore, the holding member (lid plate 4A) can be coupled to the outer surface portion (protrusion 3A) of the seat adjuster (recliner 3) by a simple structure which is easily visible from the outside.

Further, the holding member (lid plate 4A) is welded and fixed to the outer surface portion (protrusion 3A) of the seat adjuster (recliner 3) (welding place W). With this configuration, the holding member (lid plate 4A) can be integrally coupled to the outer surface portion (protrusion 3A) of the seat adjuster (recliner 3) in a simple and firm manner. Therefore, the seat adjuster (recliner 3) can be more firmly coupled to the seat frame (side frame 2Fa).

Second Embodiment

Figure 4:
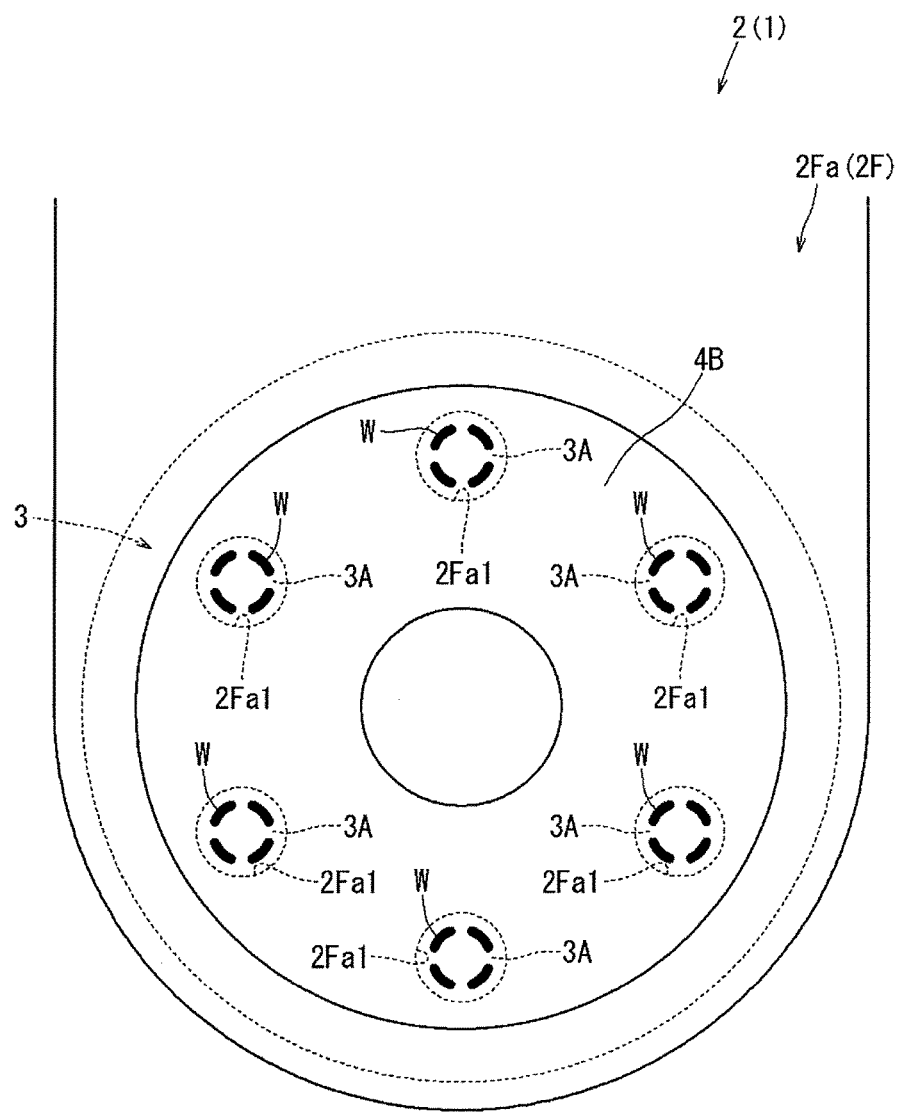
FIG. 4 is a side view showing a schematic configuration of a vehicle seat according to a second embodiment.

Subsequently, a configuration of the seat 1 (vehicle seat) according to a second embodiment will be described with reference to FIG. 4. In the present embodiment, a lid plate 4B (holding member) is abutted against and welded to the end surface portions of the protrusions 3A of each recliner 3 (seat adjuster) which are fitted and exposed in the through-holes 2Fa1 of each side frame 2Fa (seat frame). The lid member 4B (holding member) is formed in a shape of one large circular disc which is abutted against all the protrusions 3A. The lid plate 4B is individually laser-welded and coupled to each of the protrusions 3A (welding place W). With this configuration, the number of parts of the lid plate 4B can be reduced, and thus, labor for assembling can be reduced. Meanwhile, since the configurations other than the above are the same as the configurations shown in the first embodiment, the same reference numerals are given and description thereof will be omitted.

Third Embodiment

Figure 5:
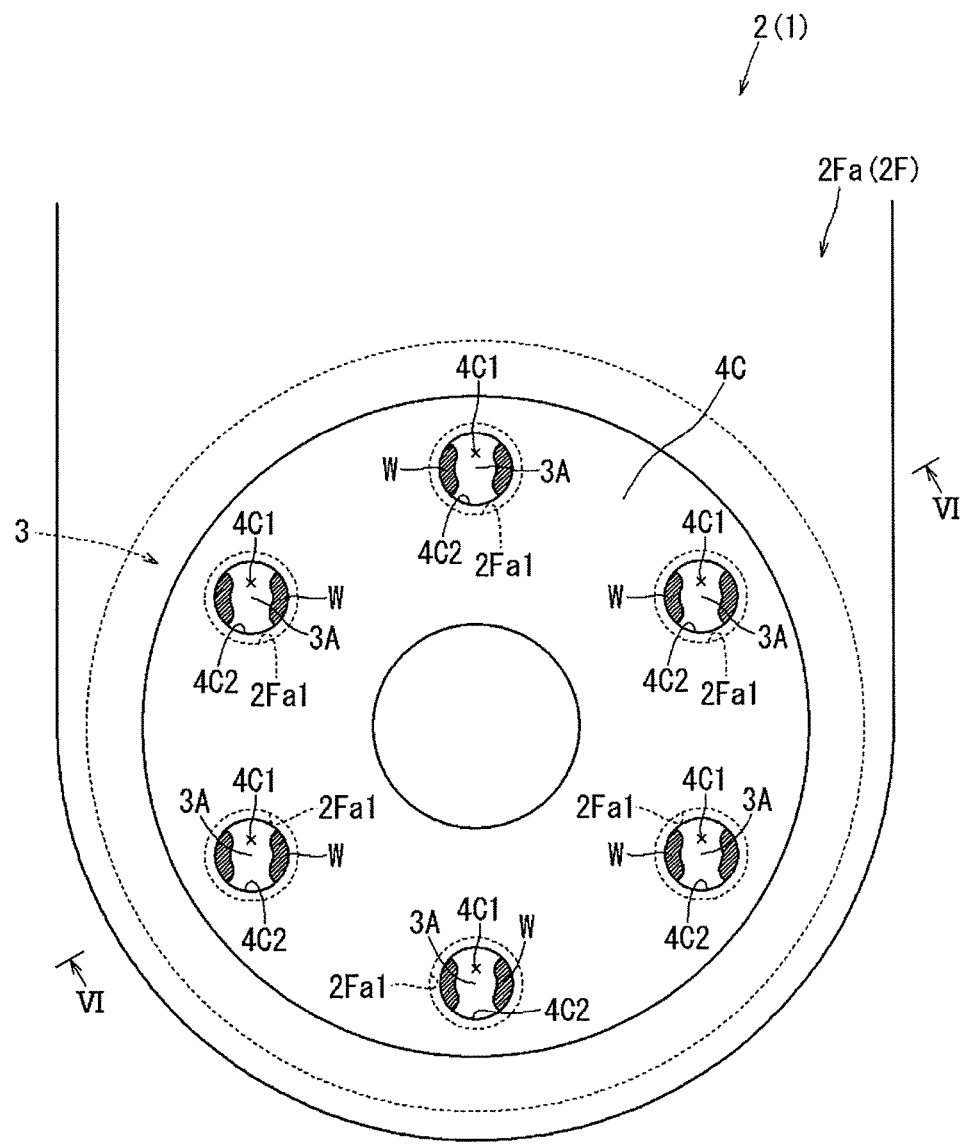
FIG. 5 is a side view showing a schematic configuration of a vehicle seat according to a third embodiment.
Figure 6:
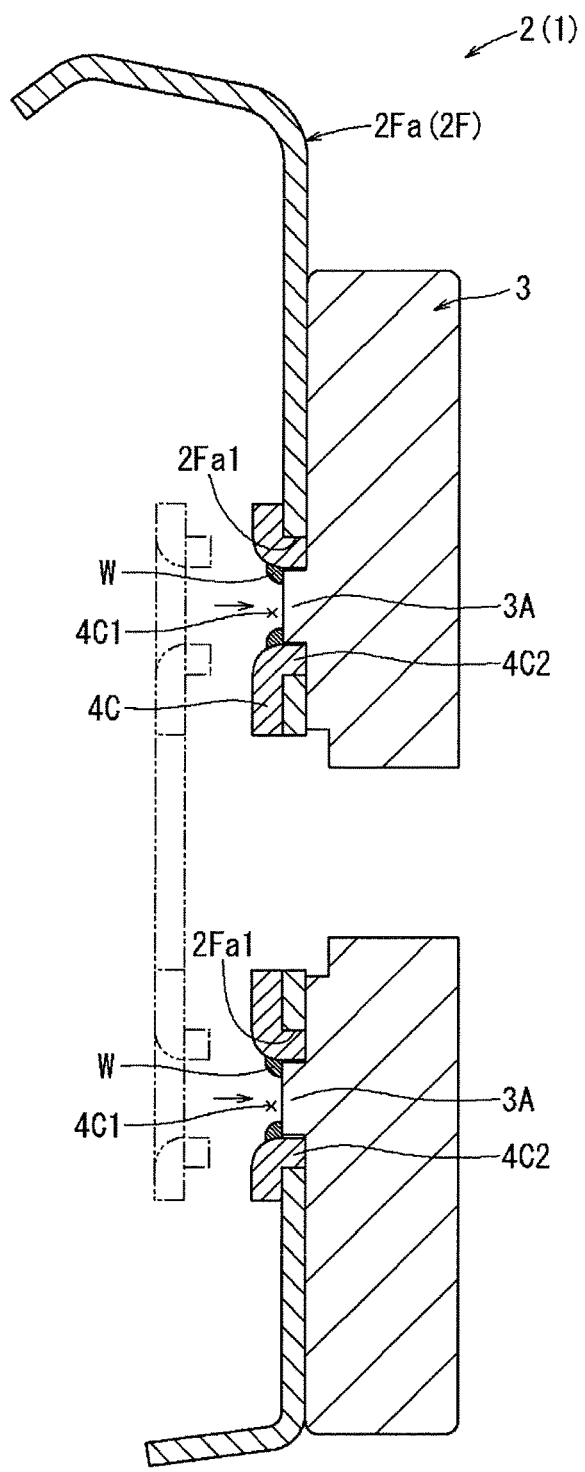
FIG. 6 is a sectional view taken along line VI-VI in FIG. 5.

Subsequently, a configuration of the seat 1 (vehicle seat) according to a third embodiment will be described with reference to FIGS. 5 and 6. In the present embodiment, each of the protrusions 3A of each recliner 3 (seat adjuster) exposed through the through-holes 2Fa1 of each side frame 2Fa (seat frame) is formed in a columnar shape having an outer diameter smaller than each of the through-holes 2Fa1. With this configuration, each protrusion 3A is configured to be fitted into each through-hole 2Fa1 such that a gap in the hole diameter direction is formed therebetween.

A lid plate 4C (holding member) is assembled to the protrusions 3A having the above-described structure in a form of a lid covering the through-holes 2Fa1. The lid plate 4C (holding member) is formed in a shape of one large circular disc which is abutted against all the protrusions 3A, as in the configuration shown in the second embodiment. However, in each of six circumferential regions of the lid plate 4C set at positions covering the through-holes 2Fa1, a circular hole 4C1 having a round hole shape and having substantially the same hole diameter as the outer diameter of each protrusion 3A is respectively formed, and a flange 4C2 is formed by protruding a peripheral edge portion of each circular hole 4C1 into a cylindrical shape by burring processing. Each of the flanges 4C2 is formed in a cylindrical shape having an outer diameter to be fitted into each through-hole 2Fa1 described above. The lid plate 4C is set in a form of a lid covering each through-hole 2Fa1. With this assembling, the flange 4C2 is assembled in a state of being fitted into a gap in the hole diameter direction between each through-hole 2Fa1 and each protrusion 3A.

After the lid plate 4C is assembled in a state where each flange 4C2 is fitted into the gap between each through-hole 2Fa1 and each protrusion 3A as described above, contact places between inner peripheral surfaces of the flanges 4C2 and the protrusions 3A exposed in the cylinders thereof (in the circular hole 4C1) are respectively arc-welded. In this way, the lid plate 4C is integrally coupled to the protrusions 3A (welding places W). Meanwhile, since the configurations other than the above are the same as the configurations shown in the first embodiment, the same reference numerals are given and description thereof will be omitted.

Fourth Embodiment

Figure 7:
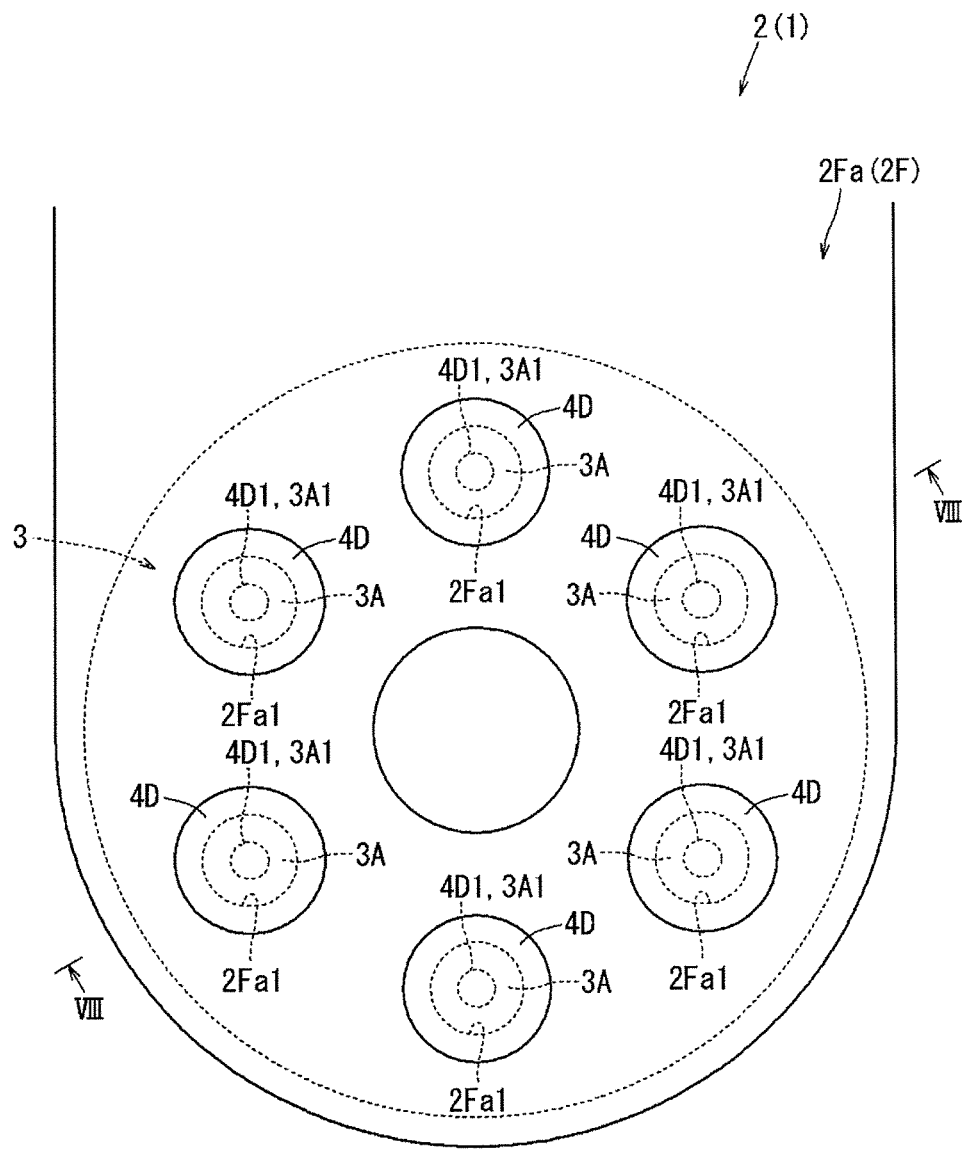
FIG. 7 is a side view showing a schematic configuration of a vehicle seat according to a fourth embodiment.
Figure 8:
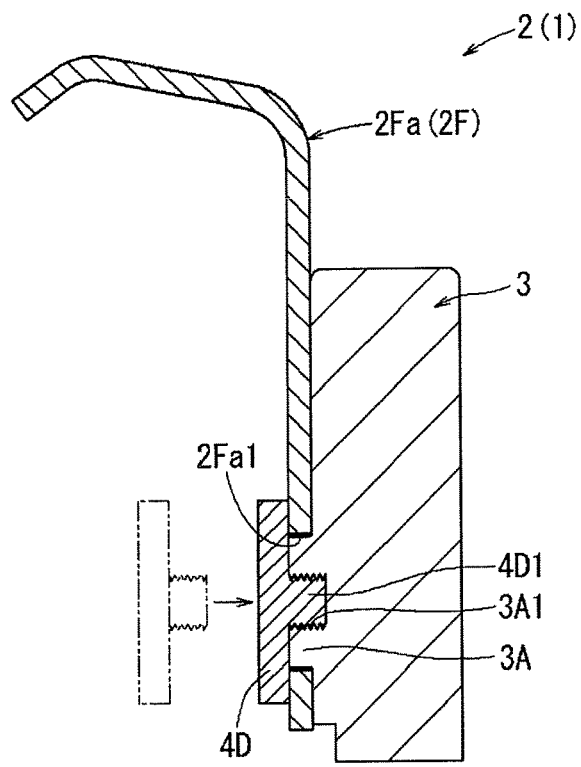
FIG. 8 is a sectional view taken along line VIII-VIII in FIG. 7.
Figure 8:
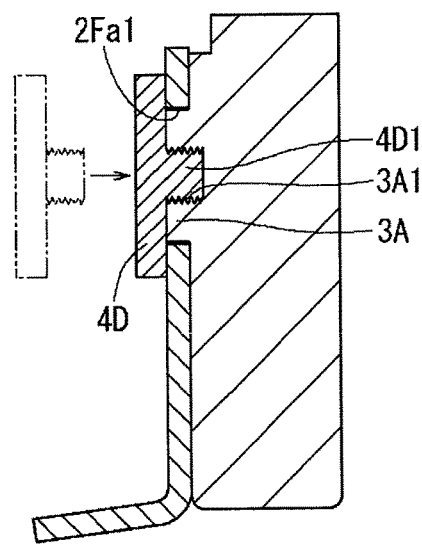

Subsequently, a configuration of the seat 1 (vehicle seat) according to a fourth embodiment will be described with reference to FIGS. 7 and 8. In the present embodiment, each lid plate 4D (holding member), which is abutted against the end surface portion of each protrusion 3A of each recliner 3 (seat adjuster) fitted and exposed in the through-hole 2Fa1 of each side frame 2Fa (seat frame), is configured to be coupled to each protrusion 3A by an insertion-type fastening structure. Specifically, on the surface portion of each lid plate 4D facing the end surface portion of each protrusion 3A, a male threaded screw shaft 4D1 is formed in a protruding shape. Each lid plate 4D described above is integrally coupled to each protrusion 3A by screwing and fastening each screw shaft 4D1 described above into each corresponding female threaded hole 3A1 provided in the end surface portion of each protrusion 3A.

Here, the structure in which each screw shaft 4D1 described above is inserted and fastened into each corresponding female threaded hole 3A1 corresponds to the "insertion-type fastening structure" of the disclosure. Meanwhile, since the configurations other than the above are the same as the configurations shown in the first embodiment, the same reference numerals are given and description thereof will be omitted.

As described above, since the holding member (lid plate 4D) and the outer surface portion (protrusion 3A) of the seat adjuster (recliner 3) are coupled together by the insertion-type fastening structure (structure in which the screw shaft 4D1 is screwed and fastened into the female threaded hole 3A1), the holding member (lid plate 4D) can be coupled to the outer surface portion (protrusion 3A) of the seat adjuster (recliner 3) by a simple method using insertion.

Fifth Embodiment

Figure 9:
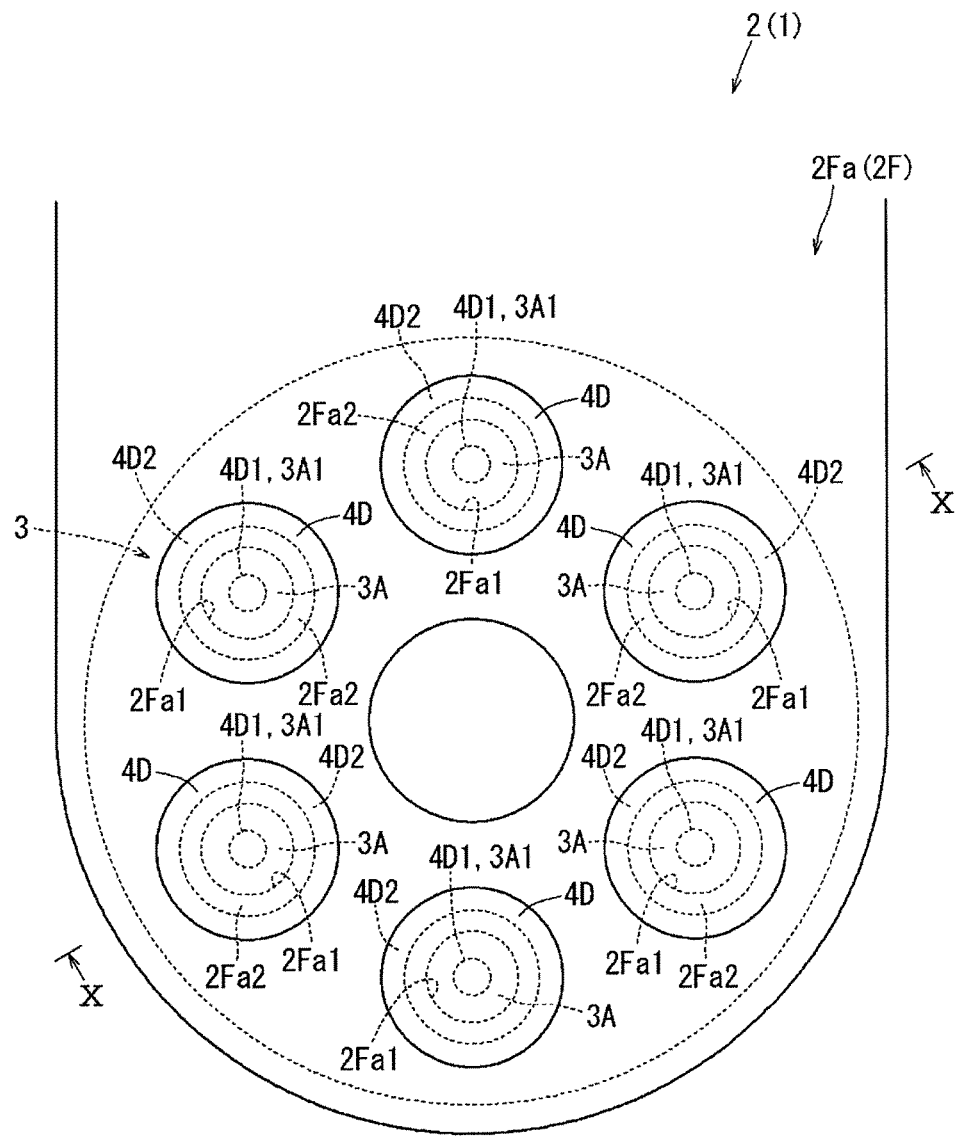
FIG. 9 is a side view showing a schematic configuration of a vehicle seat according to a fifth embodiment.

Subsequently, a configuration of the seat 1 (vehicle seat) according to a fifth embodiment will be described with reference to FIGS. 9 and 10. In the present embodiment, each lid plate 4D (holding member) has a configuration (insertion-type fastening structure) in which the screw shaft 4D1 is screwed and fastened in the corresponding female threaded hole 3A1 provided in the end surface portion of each protrusion 3A, as in the configuration shown in the fourth embodiment. However, along with the above fastening, a peripheral edge portion 2Fa2 of each corresponding through-hole 2Fa1 of the side frame 2Fa (seat frame) on each side is caulked in a manner of being abutted against the corresponding protrusion 3A of the recliner 3 (seat adjuster) on each side in the hole diameter direction.

Figure 10:
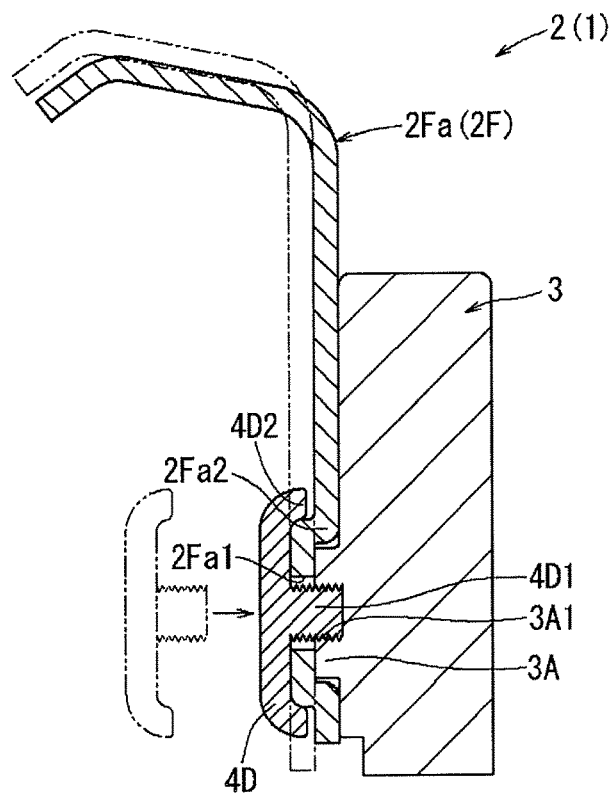
FIG. 10 is a sectional view taken along line X-X in FIG. 9.
Figure 10:
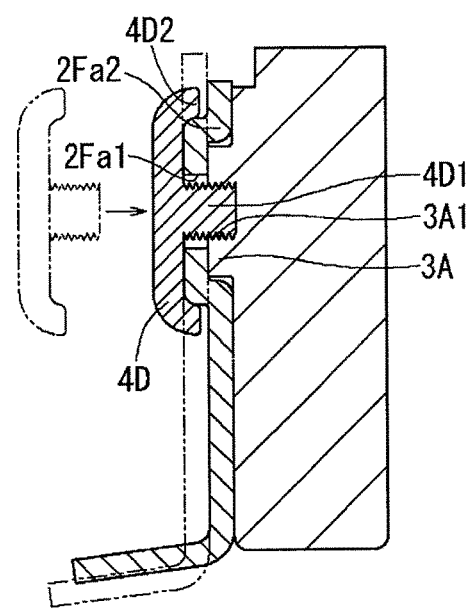

Specifically, as shown in FIG. 10, each lid plate 4D is formed with a cylindrical flange portion 4D2 that protrudes shorter than the screw shaft 4D1 in the same direction as the screw shaft 4D1 from its peripheral edge portion. Each flange portion 4D2 has a cylindrical shape whose inner diameter is larger than an outer diameter of each protrusion 3A. Further, each corresponding through-hole 2Fa1 formed in each side frame 2Fa (seat frame) has a regular circular shape whose hole diameter is larger than the outer diameter of the corresponding screw shaft 4D1 of each lid plate 4D described above but is smaller than the outer diameter of each corresponding protrusion 3A formed to each recliner 3. With this configuration, each side frame 2Fa is configured such that each protrusion 3A does not penetrate through the inside of each through-hole 2Fa1 but is set in a state being abutted against an outer surface portion of the peripheral edge portion 2Fa2 of each through-hole 2Fa1.

For each protrusion 3A having the above configuration, the screw shaft 4D1 of each corresponding lid plate 4D is inserted into each corresponding through-hole 2Fa1 of each side frame 2Fa from the inner surface side and screwed into each female threaded hole 3A1. Then, in the course of the screwing, the flange portion 4D2 of each lid plate 4D is strongly pressed against the peripheral edge portion 2Fa2 of each corresponding through-hole 2Fa1 of each side frame 2Fa from the inner surface side. Then, the screw shaft 4D1 of each lid plate 4D is further screwed into the female threaded hole 3A1 of each protrusion 3A from the above state. In this way, by the screwing force, the peripheral edge portion 2Fa2 of each through-hole 2Fa1 of each side frame 2Fa is caulked to be bent in a substantially hat shape conforming to a space shape between the flange portion 4D2 of each lid plate 4D and each protrusion 3A of each recliner 3 in a manner of being pushed and pinched therebetween. By the above caulking, each lid plate 4D and each protrusion 3A of each recliner 3 are, respectively, strongly pressed against each side frame 2Fa over the entire circumferential region in the hole diameter direction of each through-hole 2Fa1, and thus, are assembled in such a manner not to cause the rattling.

As described above, in the seat 1 of the present embodiment, the through-hole (through-hole 2Fa1) is formed in a shape whose hole diameter is smaller than the protrusion (protrusion 3A). The holding member (lid plate 4D) is inserted from the opening opposite to the insertion side of the protrusion (protrusion 3A) of the through-hole (through-hole 2Fa1) and is fastened to the end surface portion at the protruded tip of the protrusion (protrusion 3A), so that the seat frame (side frame 2Fa) is caulked along the shape of the holding member (lid plate 4D) in a concave shape in which the protrusion (protrusion 3A) is nested. In this way, a substantial hole (concave portion formed by caulking the peripheral edge portion 2Fa2 of the through-hole 2Fa1 in a substantially hat shape) into which the protrusion (protrusion 3A) is inserted is formed. Meanwhile, since the configurations other than the above are the same as the configurations shown in the first embodiment, the same reference numerals are given and description thereof will be omitted.

Sixth Embodiment

Figure 11:
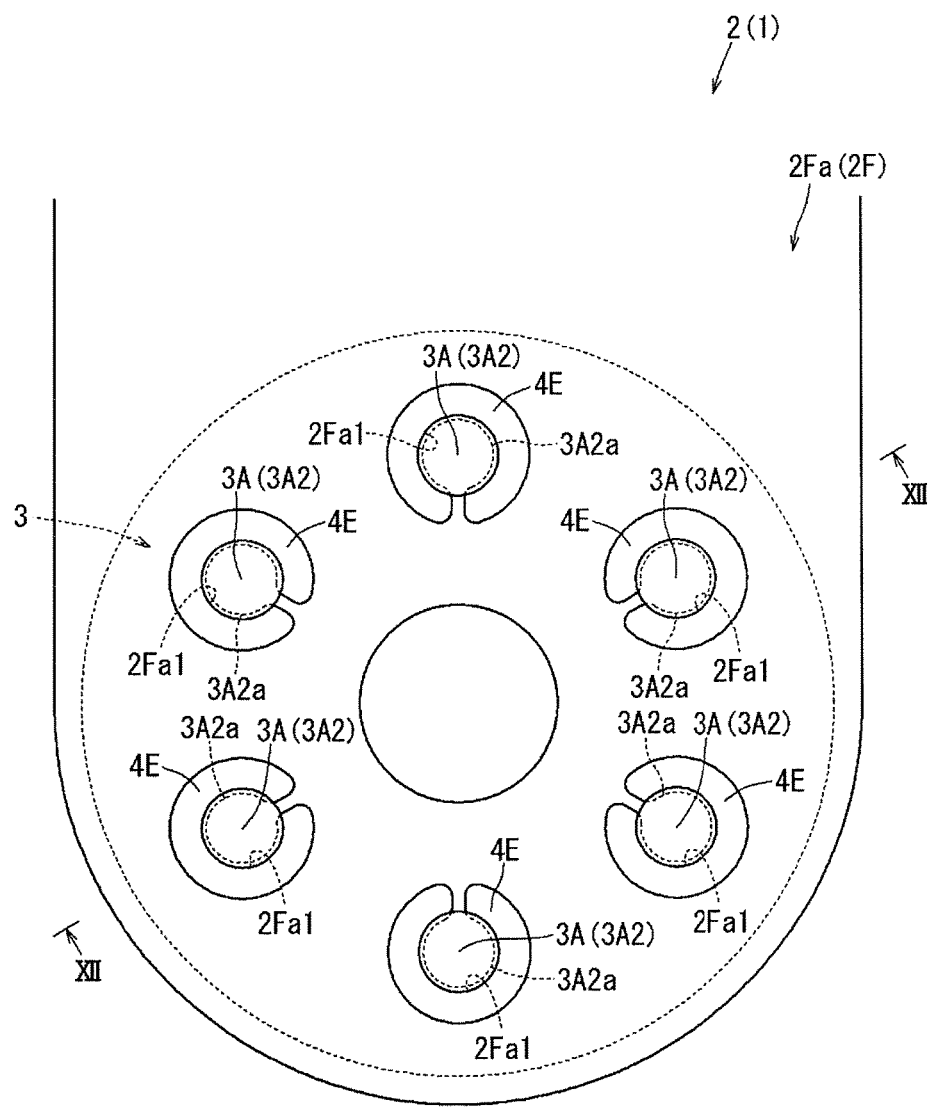
FIG. 11 is a side view showing a schematic configuration of a vehicle seat according to a sixth embodiment.
Figure 12:
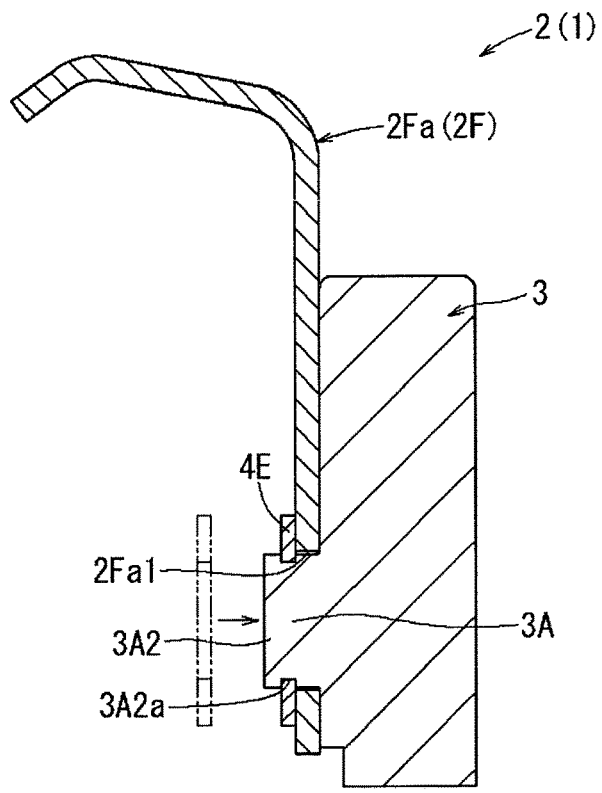
FIG. 12 is a sectional view taken along line XII-XII in FIG. 11.
Figure 12:
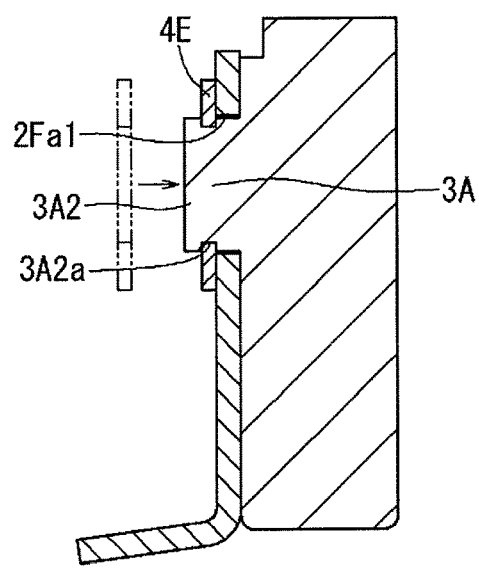

Subsequently, a configuration of the seat 1 (vehicle seat) according to a sixth embodiment will be described with reference to FIGS. 11 and 12. In the present embodiment, each protrusion 3A protruding from the recliner 3 (seat adjuster) on each side has a protruding portion 3A2 that protrudes by being inserted to a position penetrated through each corresponding through-hole 2Fa1 formed in the side frame 2Fa (seat frame) on each side. For the protruding portion 3A2 of each protrusion 3A, which is a portion of each protrusion 3A that has penetrated through each through-hole 2Fa1, a hollow disc shaped C-ring 4E (holding member) serving as a retaining ring having an outer diameter larger than the hole diameter of each through-hole 2Fa1 is fitted into an annular groove 3A2a formed on an outer peripheral portion of each protruding portion. With this configuration, each recliner 3 is held in a state where each protrusion 3A is not removed from each corresponding through-hole 2Fa1 of each side frame 2Fa via each C-ring 4E. Meanwhile, since the configurations other than the above are the same as the configurations shown in the first embodiment, the same reference numerals are given and description thereof will be omitted.

As described above, the holding member (C-ring 4E) includes the retaining ring which is fitted into the annular groove (groove 3A2a) formed on the outer peripheral portion of the protruding portion (protruding portion 3A2) of the protrusion (protrusion 3A) which is a portion of the protrusion (protrusion 3A) that has penetrated through the through-hole (through-hole 2Fa1). Therefore, the holding member (C-ring 4E) can be properly coupled to the outer surface portion of the seat adjuster (recliner 3) by simple attachment using the protruding shape of the protrusion (protrusion 3A).

Seventh Embodiment

Figure 13:
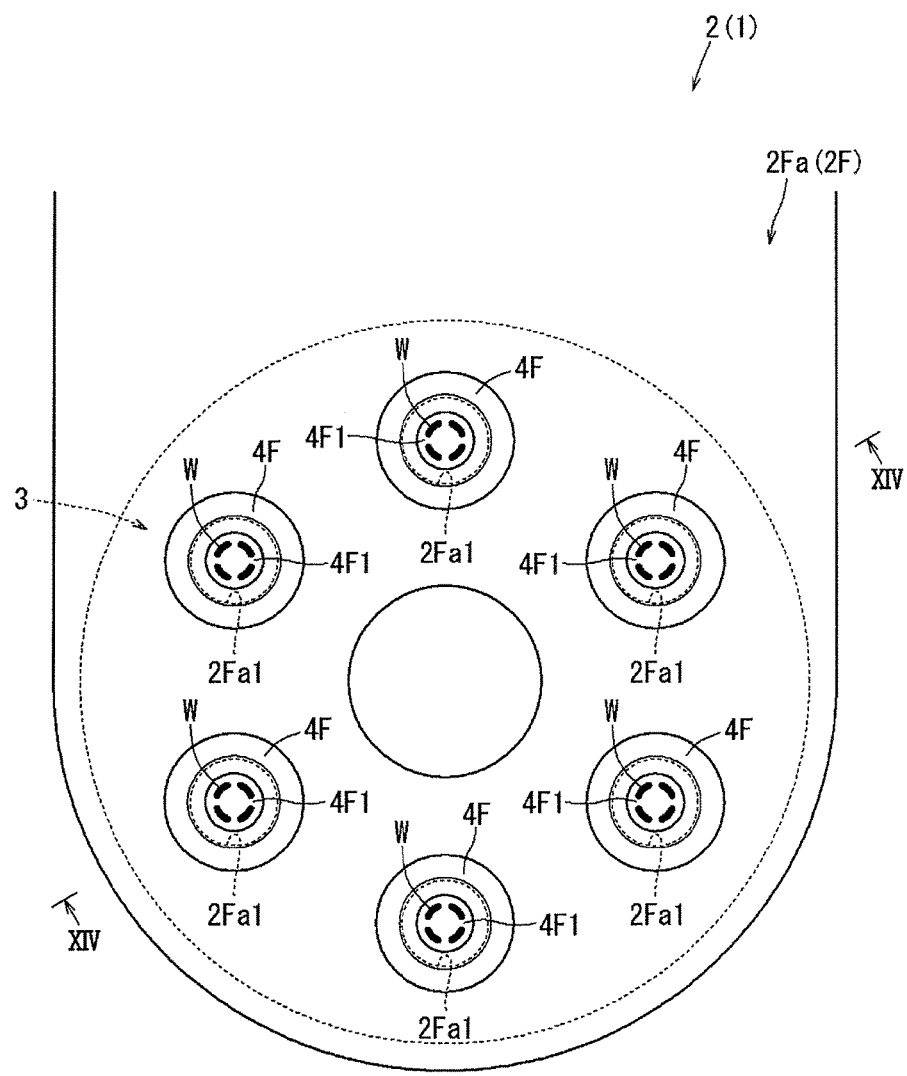
FIG. 13 is a side view showing a schematic configuration of a vehicle seat according to a seventh embodiment.
Figure 14:
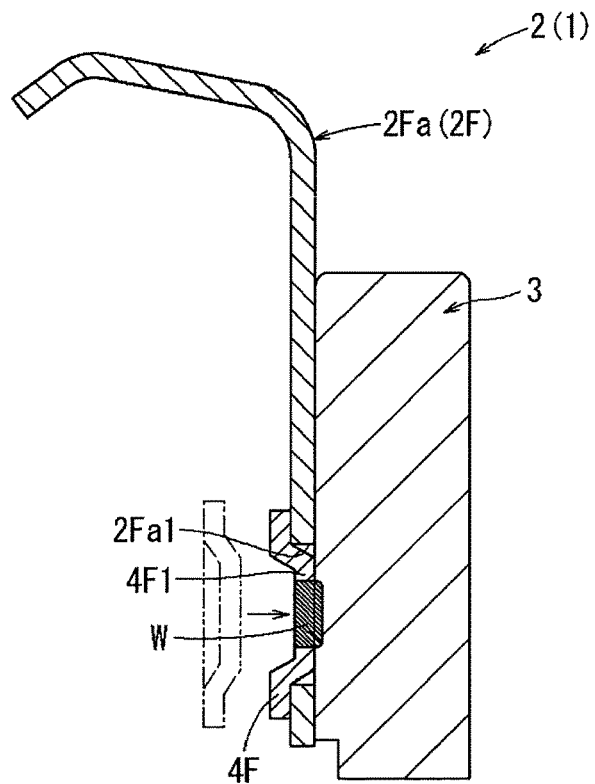
FIG. 14 is a sectional view taken along line XIV-XIV in FIG. 13.
Figure 14:
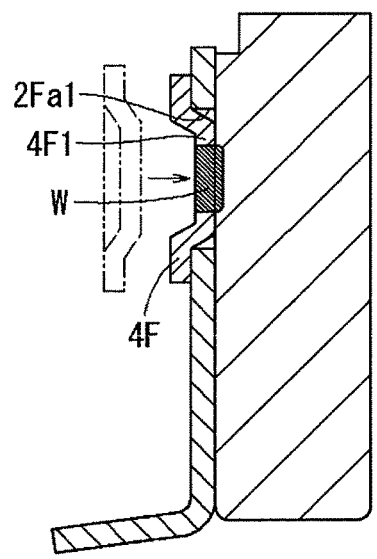

Subsequently, a configuration of the seat 1 (vehicle seat) according to a seventh embodiment will be described with reference to FIGS. 13 and 14. In the present embodiment, for each recliner 3 (seat adjuster), the protrusions to be inserted into the through-holes 2Fa1 formed in each side frame 2Fa (seat frame) are not formed. Instead, for each disc-shaped lid plate 4F assembled in a shape to cover the through-holes 2Fa1 set in a form of a lid, stepped portions 4F1 set in a state of being inserted into the through-holes 2Fa1 and being in surface contact with the inner surface portion of each recliner 3 are formed. Each of the stepped portions 4F1 is drawn into a substantially hat shape. Each of the lid plates 4F is configured in a disc shape where its outer diameter is larger than the hole diameter of each through-hole 2Fa1, and the above-described stepped portions 4F1 are formed at the central portion thereof. Each stepped portion 4F1 has a shape extruded in a substantially trapezoidal cross-section. A slanted outer peripheral surface portion of each stepped portion 4F1 is abutted against an inner peripheral surface of each through-hole 2Fa1 and a play therebetween in the hole diameter direction is filled. A top plate surface portion at the extruded tip of each stepped portion 4F1 is set in a state of being in surface contact with the inner surface portion of each recliner 3. Then, contact places between the top plate surface portions of the stepped portions 4F1 of the lid plates 4F and the inner surface portion of each recliner 3 are laser-welded and integrally coupled, respectively (welding places W).

Although the disclosure has been described using seven embodiments, the disclosure can be implemented in various forms other than the above embodiments. For example, the configuration of the vehicle seat of the disclosure can be widely applied to seats provided for vehicles other than the automobile, such as a train, an airplane and a ship. Further, the configuration of the disclosure can be applied not only to the structure for coupling the recliner as the seat adjuster and the structural frame of the seat back but also to the structure for coupling the recliner and the base-side structural frame (such as the seat cushion) fixed to the floor side.

Further, the seat adjuster and the seat frame may be made of a combination of dissimilar materials which are difficult to be welded directly to each other, such as a combination of an iron material and an aluminum material, in addition to a combination of the same materials which are easy to be welded directly to each other. By performing the coupling via the holding member shown in each of the above embodiments even in the case that the seat adjuster and the seat frame are made of the combination of the dissimilar materials, both can be simply and properly coupled by using a method other than direct welding. Meanwhile, the seat adjuster and the seat frame may be made of a material other than a metal, such as a resin material.

Further, the through-hole which is formed in the seat frame and through which the outer surface portion of the seat adjuster is exposed may be formed in a hole shape other than the circular shape, such as a polygonal shape or other irregular shapes. Moreover, the protrusion protruding from the outer surface portion of the seat adjuster inserted into the through-hole does not necessarily have to protrude in the same shape as the through-hole but may have any shape that can be inserted into the through-hole. Further, the protrusion does not necessarily have to be inserted into the through-hole over the entire region in a depth direction of the hole but may be configured to be inserted shallowly into the through-hole. Even in this configuration, when a structure extending to be capable of being coupled with the protrusion is provided on the side of the holding member, both can be properly abutted and coupled.

Further, the holding member may be configured in such a way that it protrudes outward in the hole diameter direction that the through-hole and the seat frame is sandwiched between the holding member and the seat adjuster by being coupled with the outer surface portion of the seat adjuster exposed through the through-hole of the seat frame. The holding member does not necessarily have to be shaped so as to cover the entire through-hole in a form of a lid. Specifically, the holding member may be configured by a pin inserted to the protrusion from the outer side in the hole diameter direction or may be provided as a state in which it is welded to the outer peripheral portion of the protruding portion of the protrusion which is a portion of the protrusion that has penetrated through the through-hole and protrudes outward in the hole diameter direction than the through-hole. Further, the holding member may be integrally coupled to the outer surface portion of the seat adjuster by being press-fitted in a penetrating direction of the through-hole. Here, when the holding member is made of the same material as the seat frame, by welding the region of the holding member protruding outward in the hole diameter direction than the through-hole to the seat frame, the coupling strength of the holding member to the seat frame, i.e., the coupling strength of the seat adjuster to the seat frame can be further increased.

Further, the seat adjuster can be widely applied to angle adjustment mechanisms of various seat components provided as a joint of a seat structure accompanying various rotations, such as the angle adjustment of an ottoman or the angle adjustment of a front tilt of the seat cushion, the angle adjustment of an armrest, the angle adjustment of a link mechanism constituting a seat lifter, and the angle adjustment of a tumble of a seat, in addition to the mechanism for adjusting a backrest angle of the seat back.

What is claimed is:

1. A vehicle seat comprising:
    a seat adjuster serving as an angle adjustment mechanism of a seat component;
    a seat frame integrally coupled to the seat adjuster and including a through-hole having a hole diameter through which an outer surface portion of the seat adjuster is exposed; and
    a holding member which holds the seat adjuster in a state of being coupled to the seat frame by being coupled with the outer surface portion of the seat adjuster exposed through the through-hole and extending across the hole diameter of the through-hole such that the seat frame is sandwiched between the seat adjuster and the holding member.

2. The vehicle seat according to claim 1,
    wherein the outer surface portion of the seat adjuster exposed through the through-hole includes a protrusion which is inserted into the through-hole.

3. The vehicle seat according to claim 2,
    wherein the holding member includes a retaining ring which is fitted into an annular groove formed on an outer peripheral portion of a protruding portion of the protrusion which is a portion of the protrusion that has penetrated through the through-hole.

4. The vehicle seat according to claim 1,
    wherein the holding member is welded and fixed to the outer surface portion of the seat adjuster.

5. The vehicle seat according to claim 1,
    wherein the holding member and the outer surface portion of the seat adjuster are coupled together by an insertion-type fastening structure.

6. The vehicle seat according to claim 5,
    wherein the holding member is coupled to the outer surface portion of the seat adjuster by being inserted into the outer surface portion.

7. The vehicle seat according to claim 1,
    wherein, by being coupled with the outer surface portion of the seat adjuster, the holding member is abutted against the seat frame such that a play between the holding member and the seat frame in a hole diameter direction of the through-hole is filled.

* * * * *